US011203493B2

(12) United States Patent
Berg et al.

(10) Patent No.: US 11,203,493 B2
(45) Date of Patent: Dec. 21, 2021

(54) SYSTEM FOR HANDLING PARCEL FLOW WITH DAMMING CONVEYOR

(71) Applicant: Material Handling Systems, Inc., Mt. Washington, KY (US)

(72) Inventors: Nicholas A. Berg, Louisville, KY (US); Jon Todd Fuchs, Louisville, KY (US); Jeremiah Jason Futter, Lanesville, IN (US); Paul Receveur, New Albany, IN (US)

(73) Assignee: Material Handling Systems, Inc., Mt. Washington, KY (US)

( * ) Notice: Subject to any disclaimer, the term of this patent is extended or adjusted under 35 U.S.C. 154(b) by 0 days.

(21) Appl. No.: 17/092,660

(22) Filed: Nov. 9, 2020

(65) Prior Publication Data
US 2021/0261354 A1 Aug. 26, 2021

Related U.S. Application Data

(60) Provisional application No. 62/980,486, filed on Feb. 24, 2020.

(51) Int. Cl.
*B65G 47/26* (2006.01)
*B65G 47/31* (2006.01)
(Continued)

(52) U.S. Cl.
CPC ........... *B65G 47/261* (2013.01); *B65G 43/08* (2013.01); *B65G 47/31* (2013.01); *B65G 59/12* (2013.01);
(Continued)

(58) Field of Classification Search
CPC ...... B65G 47/261; B65G 43/08; B65G 47/31; B65G 59/12; B65G 2203/0233; B65G 2203/041; B65G 2203/044
(Continued)

(56) References Cited

U.S. PATENT DOCUMENTS

| 5,638,938 A | 6/1997 | Lazzarotti et al. |
| 8,002,513 B2 * | 8/2011 | Malenke ................. B65B 25/08 414/790.5 |

(Continued)

FOREIGN PATENT DOCUMENTS

| CA | 2638539 A1 * | 2/2009 | ........... B26D 7/0625 |
| CN | 109843766 B * | 2/2021 | ........... B65H 29/585 |

(Continued)

OTHER PUBLICATIONS

Korean Intellectual Property Office, International Search Report and Written Opinion issued in corresponding Application No. PCT/US2020/059650, dated Feb. 10, 2021.

*Primary Examiner* — Gene O Crawford
*Assistant Examiner* — Lester Rushin, III
(74) *Attorney, Agent, or Firm* — Stites & Harbison, PLLC; David W. Nagle, Jr.; Gary N. Stewart (57) ABSTRACT

A system for managing parcel flow includes: an upstream conveyor for receiving and conveying a bulk flow of parcels; and a damming conveyor positioned to receive parcels offloaded from the upstream conveyor. The system may also include: a destacking conveyor positioned to receive parcels offloaded from the damming conveyor and configured to separate vertically stacked parcels; and a downstream conveyor positioned to receive parcels offloaded from the destacking conveyor. The damming conveyor can be selectively activated and deactivated to offload parcels in discrete batches, instead of a continuous flow. Selective activation and deactivation of the damming conveyor and/or destacking conveyor can be based on instructions communicated from a control subsystem in accordance in a prearranged sequence or based on data from one or more sensors configured to acquire data corresponding to the positioning of parcels within the system.

23 Claims, 9 Drawing Sheets

(51) Int. Cl.
*B65G 59/12* (2006.01)
*B65G 43/08* (2006.01)

(52) U.S. Cl.
CPC ............... *B65G 2203/0233* (2013.01); *B65G 2203/041* (2013.01); *B65G 2203/044* (2013.01)

(58) Field of Classification Search
USPC ........................................................ 198/781
See application file for complete search history.

(56) References Cited

U.S. PATENT DOCUMENTS 10,646,898 B2    5/2020  Hillerich, Jr.
2018/0345324 A1* 12/2018 Hillerich, Jr. et al. . B07C 5/362
                                                       209/552

FOREIGN PATENT DOCUMENTS

DE    102015109633 A1 * 12/2016 ........... B26D 7/0616
JP       2001-304946 A    10/2001
JP        2004149302 A *   5/2004
KR    10-2007-0059092 A    6/2007
KR    10-2018-0086742 A    8/2018

* cited by examiner

SYSTEM FOR HANDLING PARCEL FLOW WITH DAMMING CONVEYOR

CROSS-REFERENCE TO RELATED APPLICATIONS

The present application claims priority to U.S. Patent Application Ser. No. 62/980,486 filed on Feb. 24, 2020, the entire disclosure of which is incorporated herein by reference.

BACKGROUND OF THE INVENTION

The present invention relates to the handling of parcels within a sorting or similar facility.

In a sorting facility for parcels, parcels are unloaded from trucks or other vehicles at unloading locations, sorted, and then loaded onto trucks or other vehicles at loading locations for delivery to the intended recipients. Thus, within the sorting facility, there is often a complex system of conveyors and equipment that facilitates transport and sorting of the parcels within the facility.

When first introduced into the system of conveyors and equipment, the parcels are randomly positioned on a conveyor in a "bulk flow." Thus, within the sorting facility, the first step is often to transform the bulk flow into a more manageable flow of parcels. For example, in some systems, the bulk flow is transformed into a singulated flow of parcels in which the parcels are positioned at substantially equal intervals and aligned (i.e., in a single file line) along a conveyor for subsequent processing. For another example, in some systems, the primary objective is simply to spread out the parcels so that a visioning system can more readily view and identify individual parcels. Although a wide variety of singulating systems and other systems exist in the art for performing the desired "transformation," there remains a need for improvements in such systems.

SUMMARY OF THE INVENTION

The present invention is a system for managing parcel flow, which includes a damming conveyor for regulating downstream parcel distribution.

A system for managing parcel flow generally includes: an upstream conveyor for receiving and conveying a bulk flow of parcels; and a damming conveyor positioned to receive parcels offloaded from the upstream conveyor. Furthermore, in some embodiments, the system also includes a destacking conveyor positioned to receive parcels offloaded from the damming conveyor; and a downstream conveyor positioned to receive parcels offloaded from the destacking conveyor.

The damming conveyor can be selectively activated and deactivated (or "indexed") to regulate the initial offloading of parcels from a distal end of the upstream conveyor onto the damming conveyor and subsequent offloading of parcels from the damming conveyor onto the destacking conveyor (or other downstream conveyor). Specifically, when activated, the damming conveyor conveys parcels offloaded from the upstream conveyor along its length for eventual offloading onto the destacking conveyor (or other downstream conveyor). When deactivated, the damming conveyor permits buildup of parcels at its proximal end to create a "dam" against a backpressure caused by the bulk flow of incoming parcels from the upstream conveyor, which effectively limits the volume of parcels offloaded from the upstream conveyor onto the damming conveyor. In this way, the damming conveyor can be deactivated to permit an accumulation of parcels to a desired batch size and subsequently activated to offload the parcels within the batch in a controlled manner to the destacking conveyor (or other downstream conveyor).

In some embodiments, the damming conveyor is oriented at a predetermined angle relative to an underlying ground surface on which it is positioned to promote accumulation of parcels on the damming conveyor when in a deactivated configuration. Furthermore, in some embodiments, the upstream conveyor may be in a declining orientation (with its proximal end at a higher elevation than its distal end), while the damming conveyor is in an inclining orientation (with its proximal end at a lower elevation than its distal end), such that the upstream conveyor and the damming conveyor collectively define a valley in which parcels can accumulate and provide the above-described "damming" action.

In some embodiments, the destacking conveyor may also be configured to be selectively activated and deactivated to regulate the offloading of parcels onto the downstream conveyor.

In some embodiments, activation and deactivation of the destacking conveyor and/or damming conveyor is regulated based on instructions communicated from a control subsystem.

In some embodiments, the control subsystem communicates instructions to selectively activate and deactivate the damming conveyor and/or destacking conveyor in accordance in a prearranged sequence. In other embodiments, the control subsystem communicates instructions to selectively activate and deactivate the damming conveyor and/or destacking conveyor in response to data acquired by one or more sensors regarding the positioning of parcels within the system.

DETAILED DESCRIPTION OF THE INVENTION

The present invention is a system for managing parcel flow, which includes a damming conveyor for regulating downstream parcel distribution.

Figure 1:
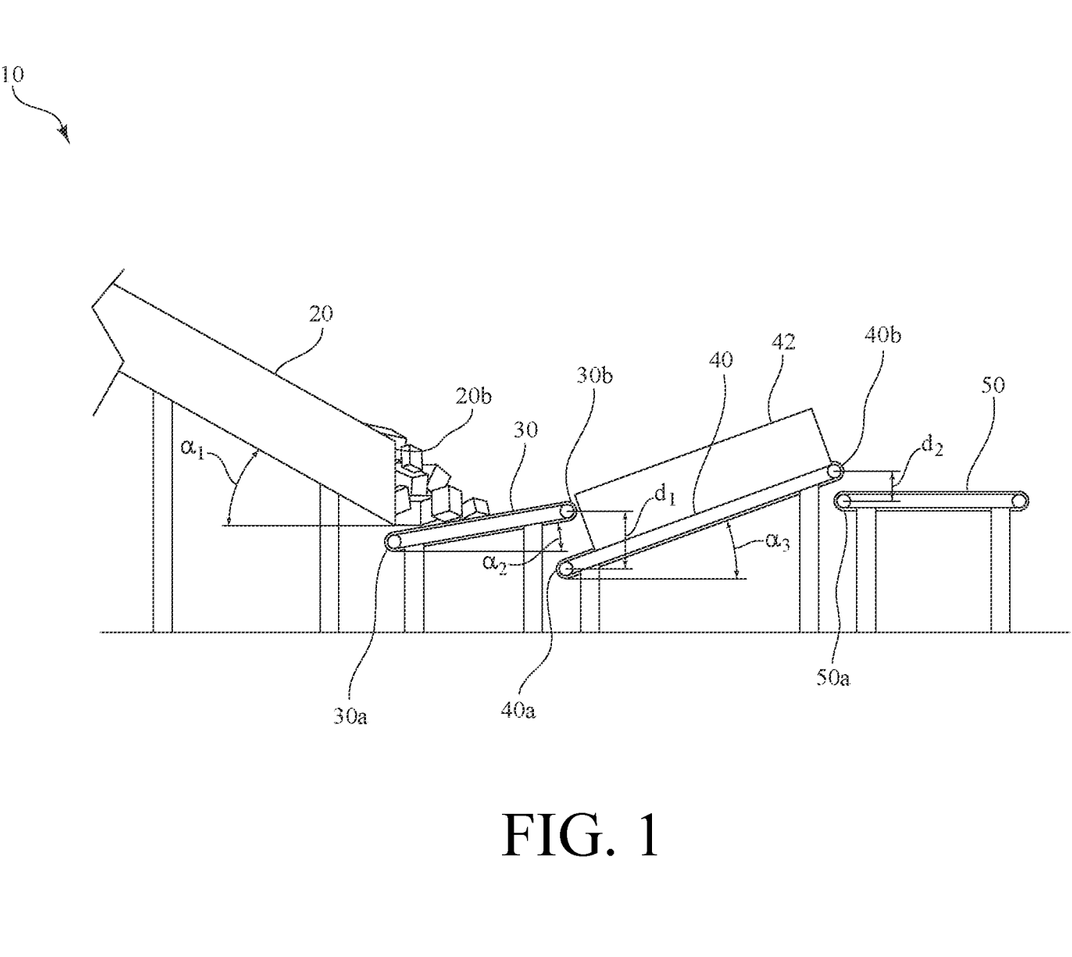
FIG. 1 is a side view of an exemplary system for managing parcel flow made in accordance with the present invention, with a bulk flow of parcels from an upstream conveyor offloaded onto a damming conveyor of the system.

FIG. 1 is a side view of an exemplary system 10 for managing parcel flow made in accordance with the present invention. As shown in FIG. 1, the exemplary system 10 includes: an upstream conveyor 20 for receiving and conveying a bulk flow of parcels; and a damming conveyor 30 having a proximal end 30a positioned to receive parcels offloaded from a distal end 20b of the upstream conveyor 20. The exemplary system 10 also includes: a destacking conveyor 40 having a proximal end 40a positioned to receive parcels offloaded from a distal end 30b of the damming conveyor 30; and a downstream conveyor 50 having a proximal end 50a positioned to receive parcels offloaded from a distal end 40b of the destacking conveyor 40. As further described below, the damming conveyor 30 can be selectively activated and deactivated (or "indexed") to regulate the initial offloading of parcels from the distal end 20b of the upstream conveyor 20 onto the damming conveyor 30 and subsequent offloading of parcels from the damming conveyor 30 onto the destacking conveyor 40. In this regard, indexing of the damming conveyor 30 thus helps to feed the destacking conveyor 40 with a discrete amount of parcels, instead of a continuous flow which may potentially overwhelm the destacking conveyor 40 and prevent effective operation thereof.

Referring still to FIG. 1, the destacking conveyor 40 is oriented at a predetermined angle to separate parcels which are vertically stacked prior to being offloaded onto the downstream conveyor 50. In some embodiments, the destacking conveyor 40 may also be selectively activated and deactivated to regulate the offloading of parcels onto the downstream conveyor 50.

As further described below with reference to FIGS. 5, 7, and 9, in some embodiments, activation and deactivation of the damming conveyor 30 and/or the destacking conveyor 40 may be regulated based on instructions communicated from a control subsystem 70, 170, 270.

Referring still to FIG. 1, as indicated above, the upstream conveyor 20 is configured to receive and subsequently convey a bulk flow of parcels to the damming conveyor 30, and thus can be any conveying device suitable for doing so, including, for example, a belt conveyor, roller conveyor, etc. In this exemplary embodiment, the upstream conveyor 20 is a chute, which defines an inclined pathway along which a bulk flow of parcels can slide downward (under the force of gravity) toward the proximal end 30a of the damming conveyor 30. In this regard, the upstream conveyor 20 is thus oriented at a predetermined angle, al, relative to the underlying ground surface on which it is positioned.

Figure 2:
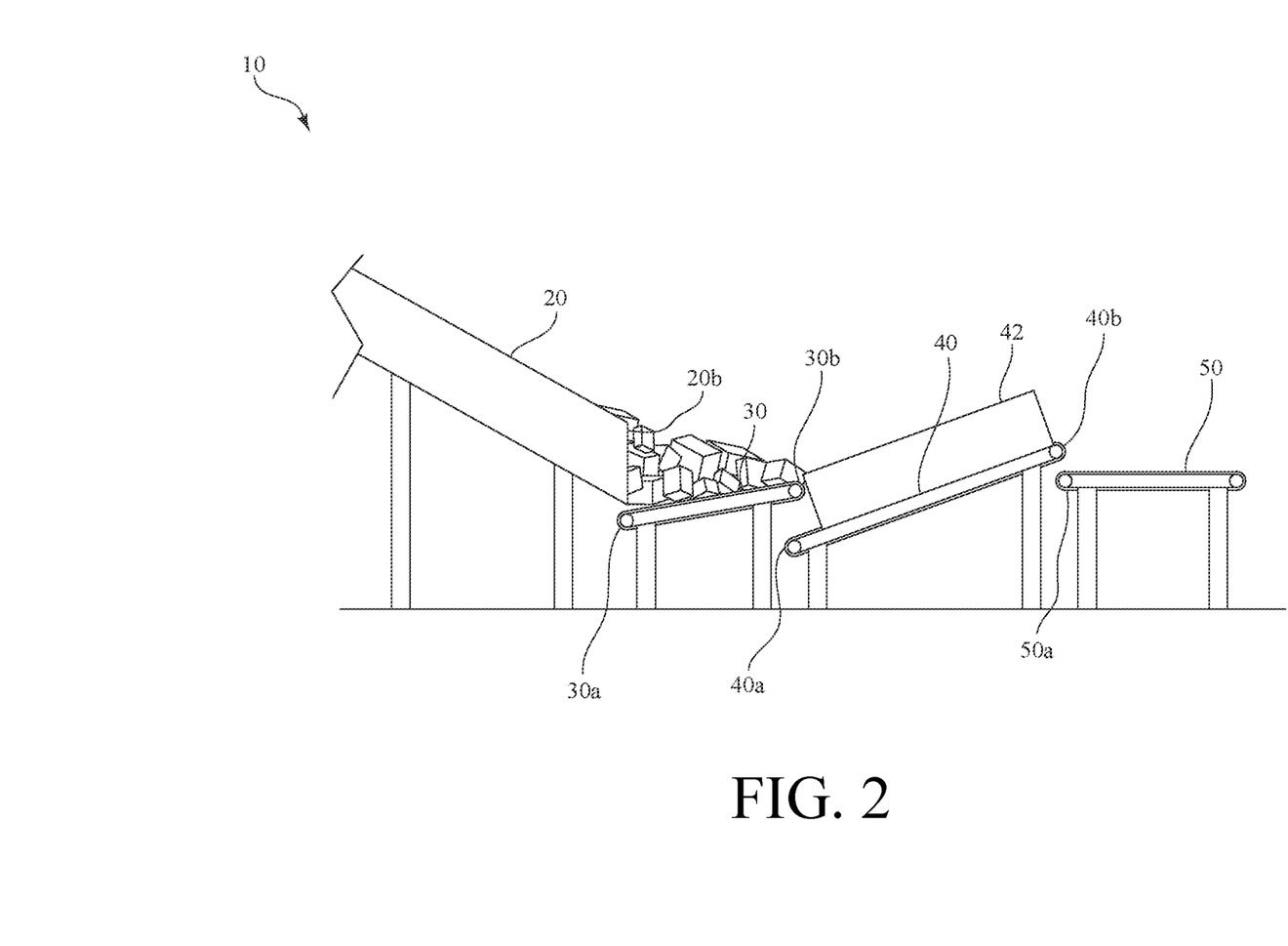
FIG. 2 is another side view of the exemplary system of FIG. 1, but, as compared to FIG. 1, with additional parcels offloaded from the upstream conveyor onto the damming conveyor of the system of FIG. 1.
Figure 3:
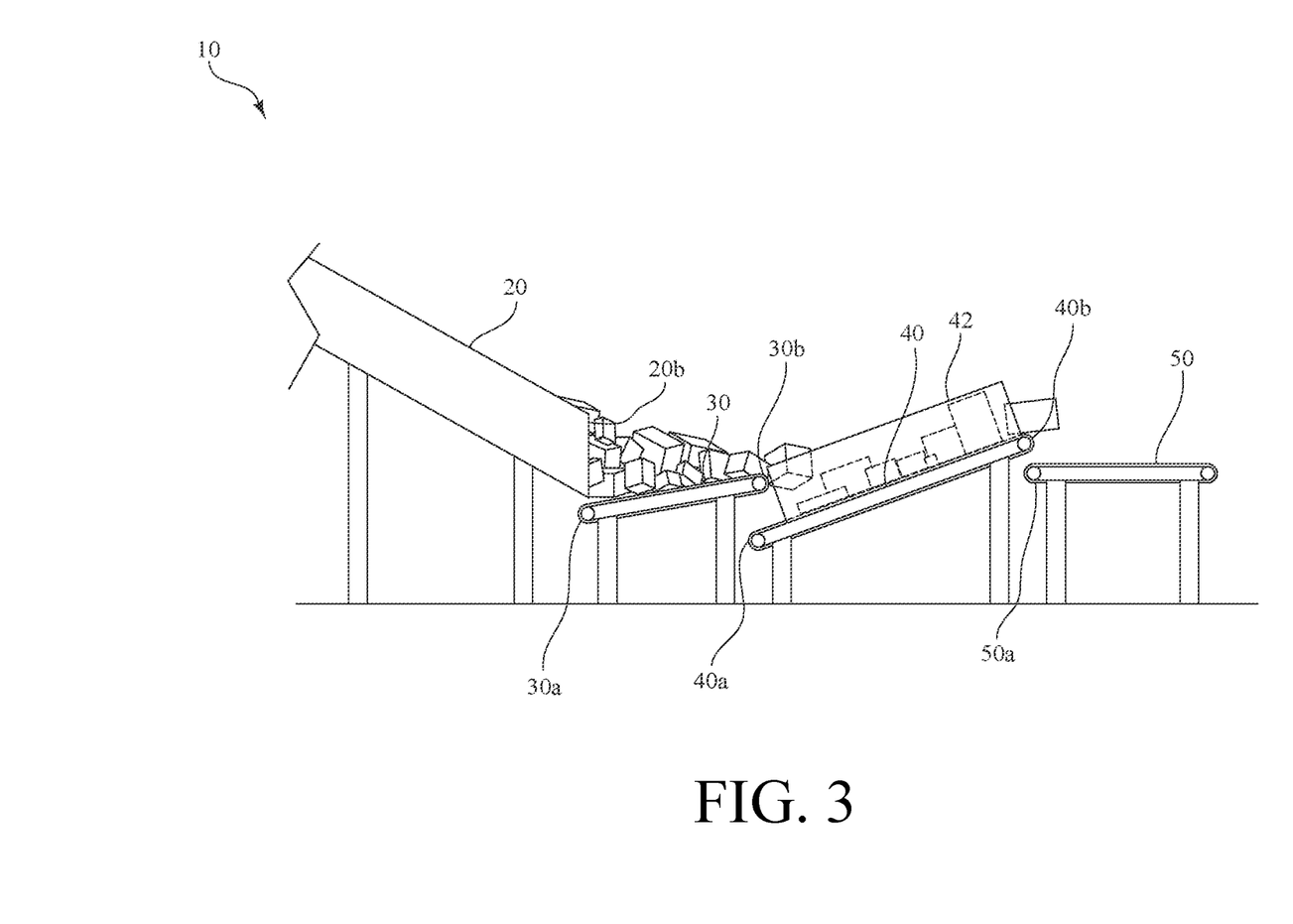
FIG. 3 is another side view of the exemplary system of FIG. 1, but, as compared to FIG. 2, with some parcels offloaded from the damming conveyor onto a destacking conveyor of the system of FIG. 1.
Figure 4:
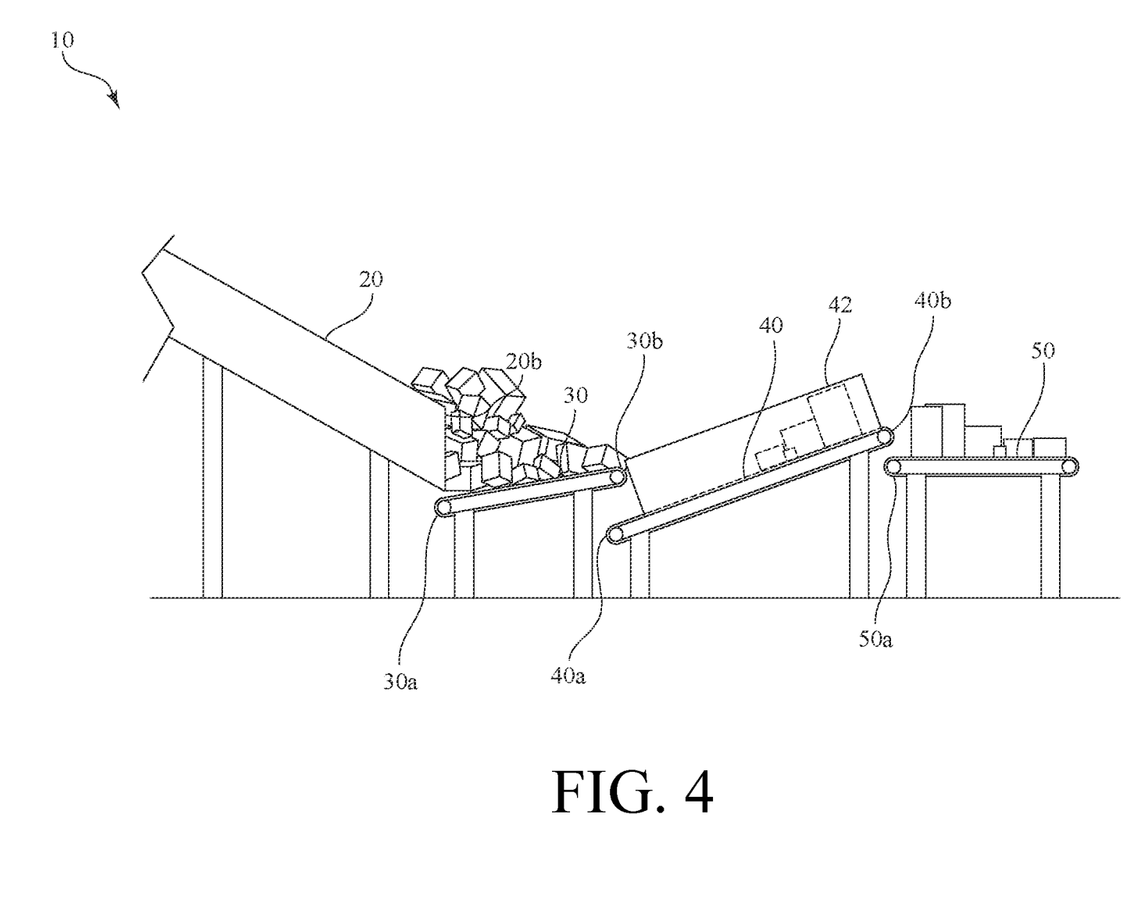
FIG. 4 is another side view of the exemplary system of FIG. 1, but, as compared to FIG. 3, with some parcels offloaded from the destacking conveyor onto a downstream conveyor, and with additional parcels offloaded from the upstream conveyor onto the damming conveyor of the system of FIG. 1.

FIGS. 2-4 are various side views of the system 10 of FIG. 1, which illustrate movement of parcels through the system 10, from the upstream conveyor (or chute) 20 to the downstream conveyor 50.

Referring now to FIGS. 1-4, in operation, the proximal end 30a of damming conveyor 30 receives parcels offloaded from the distal end 20b of the upstream conveyor 20. When activated, the damming conveyor 30 then conveys parcels along its length, from the proximal end 30a to the distal end 30b, for eventual offloading onto the destacking conveyor 40 (or other downstream conveyor). When deactivated, however, movement of parcels along the length of the damming conveyor 30 is ceased, thus permitting a buildup of parcels offloaded from the upstream conveyor 20 near the proximal end 30a of the damming conveyor 30. Such buildup eventually creates a "dam" against a backpressure caused by the bulk flow of parcels traveling down the upstream conveyor 20, which effectively limits the volume of parcels offloaded from the upstream conveyor 20 onto the damming conveyor 30. In this way, the damming conveyor 30 can be deactivated to permit an accumulation of parcels to a desired batch size and subsequently activated to offload the parcels within the batch in a controlled manner to the destacking conveyor 40.

Referring now to FIGS. 1 and 2, as mentioned above, the damming conveyor 30 is selectively activated and deactivated to transfer parcels along its length, from the proximal end 30a to the distal end 30b, which are then offloaded to the destacking conveyor 40 (or other downstream conveyor). In this exemplary embodiment, the damming conveyor 30 is selectively activated and deactivated in accordance in a prearranged (pre-programmed) sequence corresponding to periods of time where the damming conveyor 30 is activated and periods of time where the damming conveyor 30 is deactivated to intermittently offload parcels to the destacking conveyor 40 in a controlled manner (i.e., in batches) and to provide the above-described "damming" action at the distal end 20b of the upstream conveyor 20.

Referring still to FIGS. 1 and 2, as an intermediate structure between the upstream conveyor 20 and the destacking conveyor 40, with parcels transferred in batches along its length, from its proximal end 30a to the distal end 30b, the damming conveyor 30 helps to ensure the destacking conveyor 40 is able to function properly. In other words, without the damming conveyor 30 regulating parcel flow from the upstream conveyor 20 to the destacking conveyor 40 (e.g., if parcels were directly offloaded from the upstream conveyor 20 onto the destacking conveyor 40), the volume of parcels could, in many instances, overwhelm the destacking conveyor 40 and prevent the destacking conveyor 40 from effectively separating vertically stacked parcels, thereby negatively affecting subsequent downstream sorting.

Figure 5:
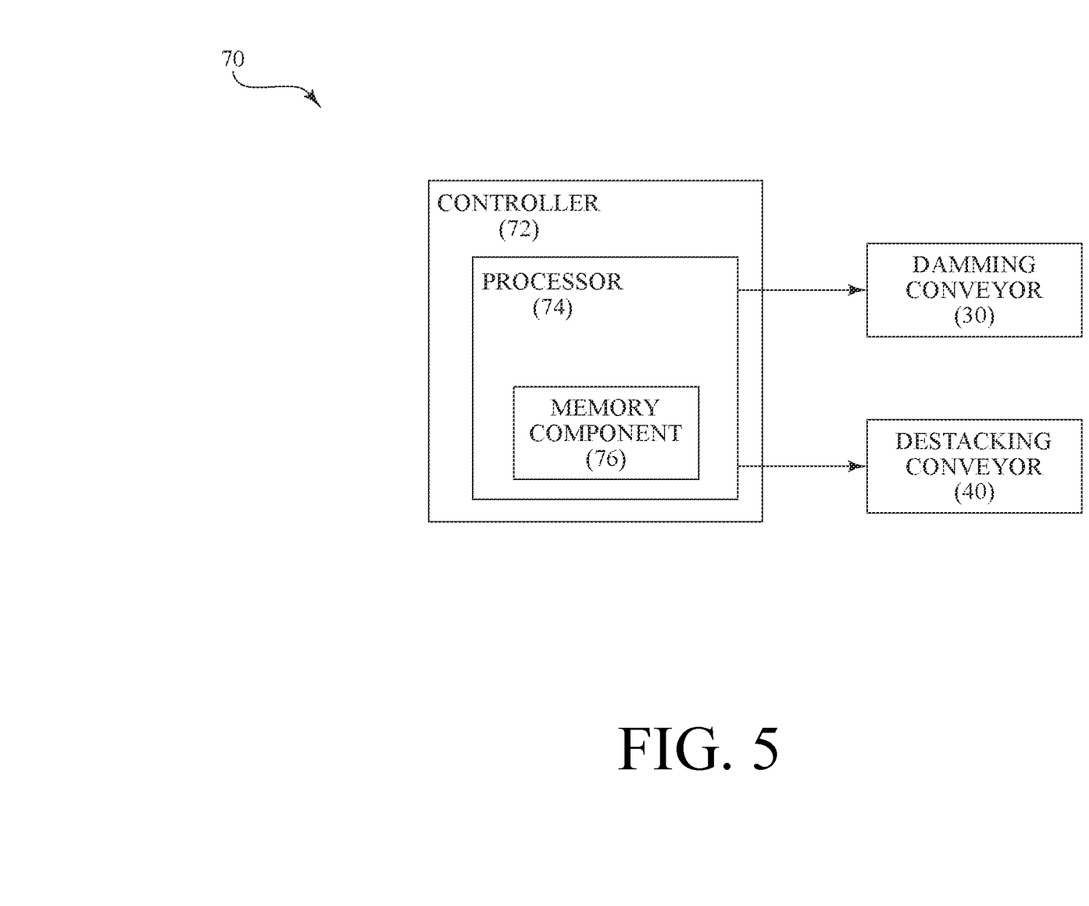
FIG. 5 is a schematic diagram of a control subsystem for regulating operation of the system of FIG. 1.

FIG. 5 is a schematic diagram of a control subsystem 70 for regulating operation of the exemplary system 10, and, more particularly, the operation of the damming conveyor 30 and the destacking conveyor 40. In this exemplary embodiment, the control subsystem 70 is comprised of a controller 72, such as a programmable logic controller (PLC), that communicates instructions to the damming conveyor 30, which causes the damming conveyor 30 to be activated and deactivated in accordance with the prearranged (pre-programmed) sequence. To this end, the controller 72 includes a processor 74 for executing instructions (routines) stored in a memory component 76 or other computer-readable medium. Accordingly, in this exemplary embodiment, the instructions stored in the memory component 76 effectively embody the prearranged sequence corresponding to activation and deactivation of the damming conveyor 30, and, thus, can be modified as needed to provide a different prearranged sequence for activation and deactivation of the damming conveyor 30 to accommodate different sorting applications and environments.

Furthermore, in this exemplary embodiment, the damming conveyor 30 is a motor-driven belt conveyor, where the motor of the damming conveyor 30 is operably connected to the processor 74 of the controller 72 of the control subsystem 70. Of course, the damming conveyor 30 could be another conveying device (e.g., a motor-driven roller conveyor) suitable for transferring parcels to the destacking conveyor 40 in a controlled manner without changing the operating principles of the system 10.

Referring again to FIGS. 1-4, in this exemplary embodiment, the damming conveyor 30 is oriented at a predetermined angle, $\alpha_2$, relative to the underlying ground surface on which it is positioned (as shown in FIG. 1). In FIGS. 1-4, in the exemplary embodiment illustrated, the damming conveyor 30 is oriented at an angle, $\alpha_2$, of approximately 10° relative to the underlying ground surface. However, in other embodiments, the damming conveyor 30 may be oriented at an angle, $\alpha_2$, in the range of 10-20° relative to the underlying ground surface. In this regard, the optimal angle is, at least in part, dependent on the coefficient of friction between the parcels and the belt of the damming conveyor 30. For a typical mix of rigid cardboard boxes and flexible plastic ("poly") bags common within sorting facilities, which are being conveyed by a rubber belt of the damming conveyor 30, the range of 10-20° is believed to be optimal and prevents parcels from falling off of the damming conveyor 30 or sliding back down. However, other angles may be more appropriate if the parcel mix was changed and/or a different form of belt was utilized to convey the parcels.

Referring still to FIGS. 1-4, as the upstream conveyor 20 is in a declining orientation (with its proximal end at a higher elevation than its distal end), while the damming conveyor 30 is in an inclining orientation (with its proximal end 30a at a lower elevation than its distal end 30b). The upstream conveyor 20 and the damming conveyor 30 thus collectively define a valley in which parcels can accumulate and provide the above-described "damming" action, as perhaps best shown in FIGS. 2 and 4.

Referring still to FIGS. 1-4, parcels offloaded from the distal end 30b of the damming conveyor 30 are received on the proximal end 40a of the destacking conveyor 40. To facilitate separation of parcels as they are offloaded from the damming conveyor 30, the proximal end 40a of the destacking conveyor 40 is preferably positioned at a predetermined distance, $d_1$, below the distal end 30b of the damming conveyor 30 (as shown in FIG. 1), so that parcels effectively tumble off of the distal end 30b of the damming conveyor 30. Furthermore, to this end, the destacking conveyor 40 is also oriented at a predetermined angle, $\alpha_3$, relative to the underlying ground surface on which the destacking conveyor 40 is positioned (as shown in FIG. 1). Specifically, in this exemplary embodiment, the destacking conveyor 40 is oriented at an angle, $\alpha_3$, of approximately 20° relative to the underlying ground surface, which is believed to be optimal for separating vertically stacked parcels in a mix of rigid cardboard boxes and flexible plastic ("poly") bags common within sorting facilities without having such parcels also slide down toward the proximal end 40a of the destacking conveyor 40 when conveyed thereon. Of course, the angle at which the destacking conveyor 40 is oriented may be adjusted to accommodate other parcel mixes. Moreover, to prevent sliding, it is generally preferred that the conveying surface of the destacking conveyor 40 be a high-friction surface. To prevent parcels from falling off of the destacking conveyor 40 as they are transitioned from a stacked configuration to an unstacked configuration, in this embodiment, the destacking conveyor 40 is provided with a pair of opposing sidewalls 42 (only one of which is shown) substantially extending the length of destacking conveyor 40.

As best shown in FIGS. 3-4, when activated, the destacking conveyor 40 conveys parcels along its length, from the proximal end 40a to the distal end 40b, for eventual offloading onto the downstream conveyor 50. Conversely, when deactivated, movement of the parcels along the length of the destacking conveyor 40 is ceased. Like the damming conveyor 30, the destacking conveyor 40 may also be selectively activated and deactivated according to a prearranged (pre-programmed) sequence, as embodied within instructions (routines) stored in the memory component 76 or other computer-readable medium, to regulate the volume of parcels offloaded from the destacking conveyor 40 onto the downstream conveyor 50 at a given time.

Furthermore, in this exemplary embodiment, the destacking conveyor 40 is a motor-driven belt conveyor, where the motor of the destacking conveyor 40 is operably connected to the processor 74 of the controller 72 of the control subsystem 70. Of course, the destacking conveyor 40 could be another conveying device (e.g., a motor-driven roller conveyor) suitable for offloading parcels to the downstream conveyor 50 in a controlled manner without changing the operating principles of the system 10. Although it is generally preferred that the destacking conveyor 40 convey parcels in an indexed manner, alternative embodiments are, however, contemplated wherein the destacking conveyor 40 remains in an activated configuration (i.e., continuously conveying parcels received thereon) during operation of the system 10.

Referring still to FIGS. 1-4, parcels offloaded from the distal end 40b of the destacking conveyor 40 are received on a proximal end 50a of the downstream conveyor 50. To ensure parcels are fully offloaded from the distal end 40b of the destacking conveyor 40 and to further promote separation of parcels, in this exemplary embodiment, a proximal end 50a of the downstream conveyor 50 is positioned at a predetermined distance, $d_2$, below the distal end 40b of the destacking conveyor 40 (as shown in FIG. 1). In this embodiment, the downstream conveyor 50 is a belt conveyor. However, the specific construction of the downstream conveyor 50 is not particularly germane to the inventive subject matter of the system, and, as such, may be any suitable device or receptacle for receiving parcels offloaded from the destacking conveyor 40. In some implementations, the downstream conveyor 50 may be an input into a singulation station, where a robot singulator (or robot) engages each parcel, and then places it onto an induction conveyor, as is described in U.S. Pat. No. 10,646,898, which is incorporated herein by reference.

Figure 6:
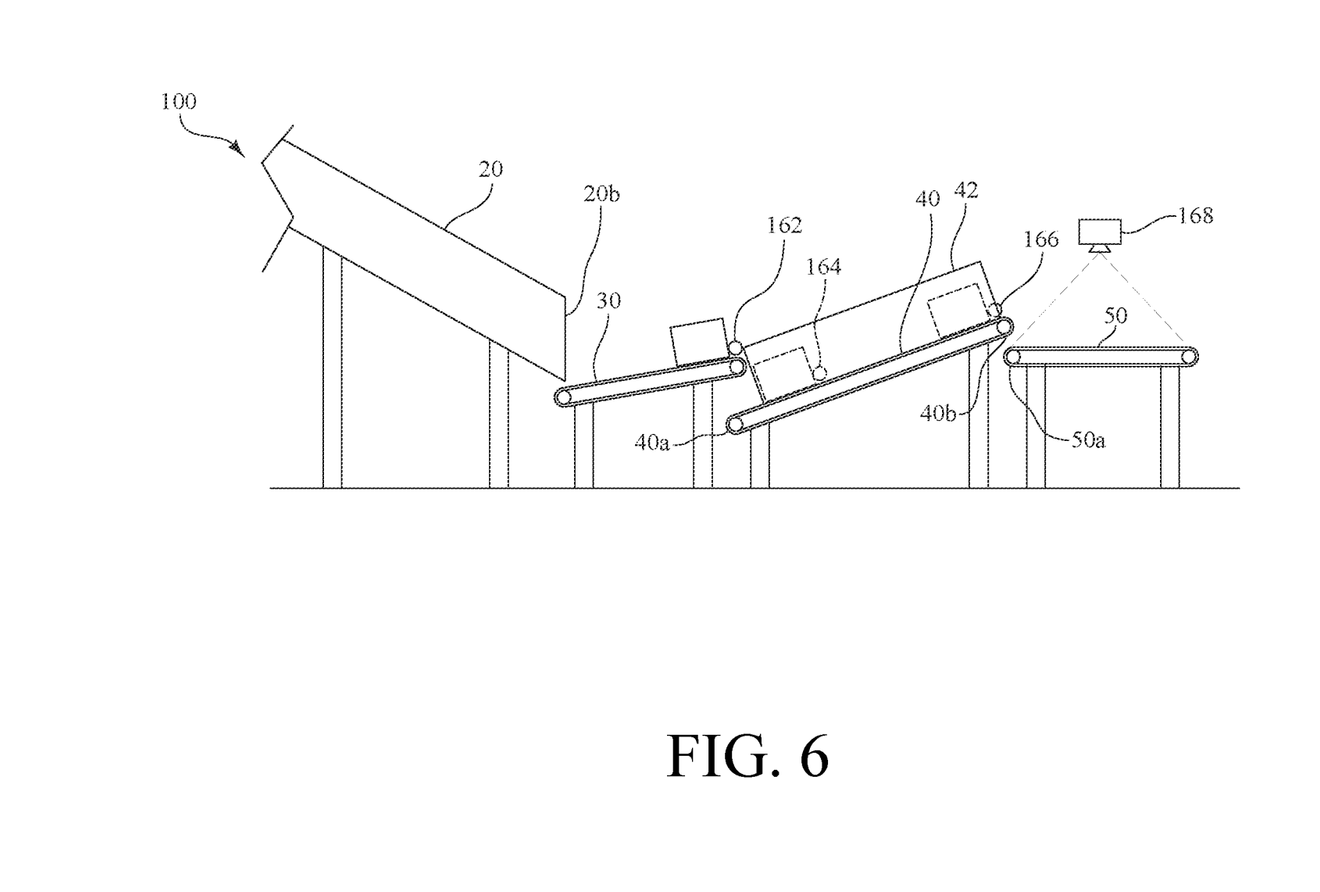
FIG. 6 is a side view of another exemplary system for managing parcel flow made in accordance with the present invention.

FIG. 6 is a side view of another exemplary system 100 for managing parcel flow made in accordance with the present invention. In this exemplary embodiment, the system 100 again includes an upstream conveyor 20, damming conveyor 30, destacking conveyor 40, and downstream conveyor 50. In other words, these components are identical to those described above with reference to FIGS. 1-5. In this regard, like components are provided with the same reference numeral throughout the present application. In this exemplary embodiment, however, instead of the damming conveyor 30 and the destacking conveyor 40 being activated and deactivated in accordance in a prearranged sequence, such components are activated and deactivated based on data received from one or more sensors 162, 164, 166, 168 corresponding to the positioning parcels within the system 100. In this exemplary embodiment, four sensors 162, 164, 166, 168 are used: a damming conveyor sensor 162, a first destacking conveyor sensor 164, a second destacking conveyor sensor 166, and a downstream conveyor sensor 168.

Referring still to FIG. 6, the damming conveyor sensor 162 is configured to detect the presence of parcels on the damming conveyor 30. Specifically, in this embodiment, the damming conveyor sensor 162 is positioned to detect the presence of parcels at the distal end 30b of the damming conveyor 30 prior to subsequent offloading onto the destacking conveyor 40. The first destacking conveyor sensor 164 is configured to detect the presence of parcels at a first location along the length of the destacking conveyor 40. In this embodiment, the first destacking conveyor sensor 164 is positioned between the proximal end 40a and the distal end 40b of the destacking conveyor 40 to confirm that parcels have been successfully offloaded from the damming conveyor 30 and are proceeding to the distal end 40b of the destacking conveyor 40. The second destacking conveyor sensor 166 is configured to detect the presence of parcels at a second location along the length of the destacking conveyor 40. In this embodiment, the second destacking conveyor sensor 166 is positioned at the distal end 40b of the destacking conveyor 40 to detect the presence of parcels on the destacking conveyor 40 prior to subsequent offloading onto the downstream conveyor 50. The downstream conveyor sensor 168 is configured to detect the presence of parcels on the downstream conveyor 50 to confirm parcels have been successfully offloaded from the destacking conveyor 40.

Referring still to FIG. 6, in this exemplary embodiment, the damming conveyor sensor 162, the first destacking conveyor sensor 164, and the second destacking conveyor sensor 166 each comprise a photoelectric eye (or photoelectric sensor) configured to emit a beam of electromagnetic radiation to detect the presence or absence of parcels at the location within the system 100 where such sensors are positioned. In this regard, the data acquired by the damming conveyor sensor 162, the first destacking conveyor sensor 164, and the second destacking conveyor sensor 166 may be in the form of a binary value, with a first value (e.g., 0) indicating no parcels are positioned at the location where the sensor is located, and a second value (e.g., 1) indicating that parcels are positioned at the location where the sensor is located. In this exemplary embodiment, the downstream conveyor sensor 168 comprises one or more cameras, where each camera is configured to acquire two-dimensional and/or three-dimensional image data. In this regard, the one or more cameras of the downstream conveyor sensor 168 are positioned to acquire images of the downstream conveyor 50 and parcels offloaded thereon.

Figure 7:
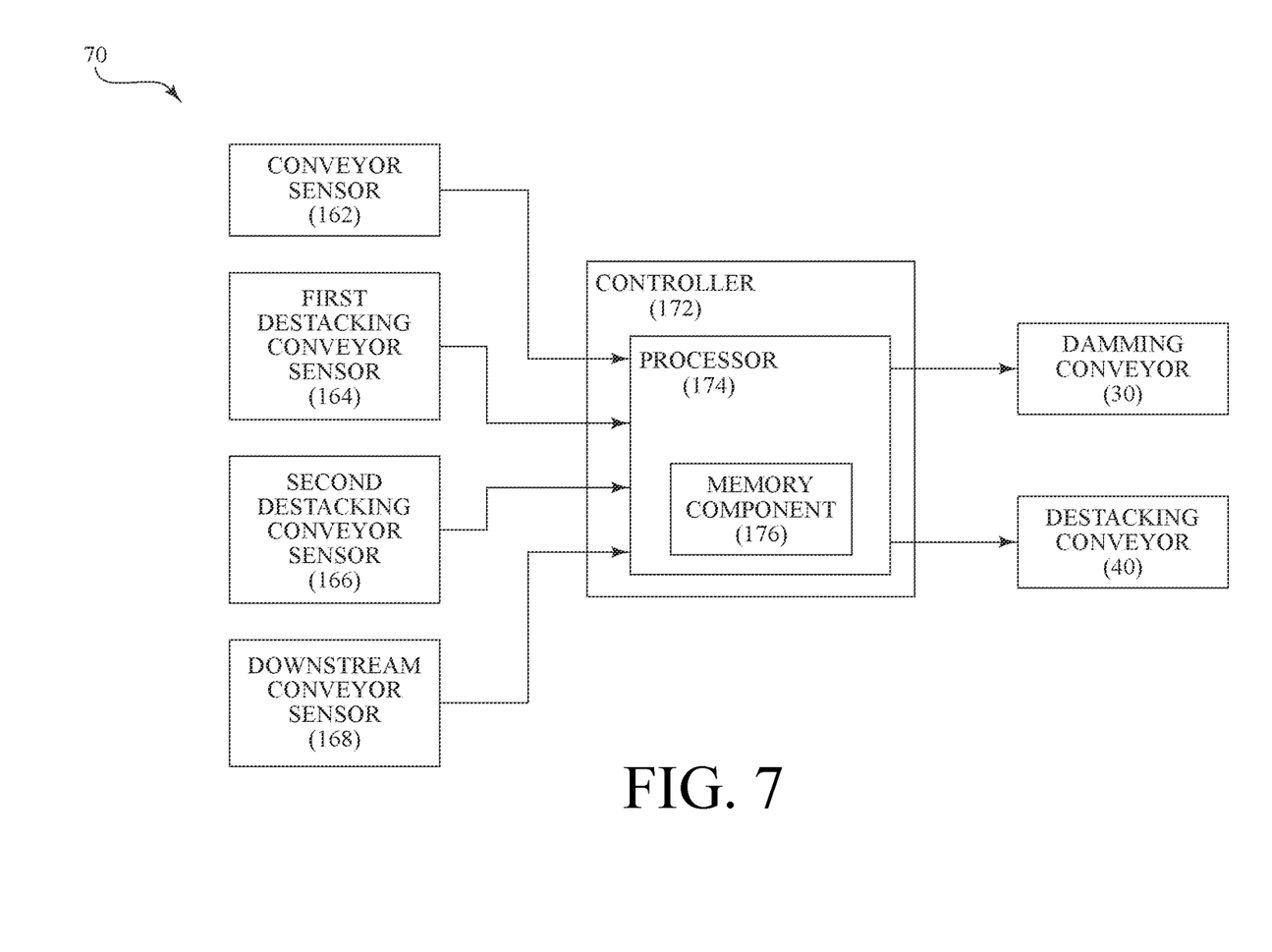
FIG. 7 is a schematic diagram of a control subsystem for regulating operation of the system of FIG. 6.

FIG. 7 is a schematic diagram of a control subsystem 170 for regulating operation of the damming conveyor 30 and destacking conveyor 40 of the system 100. In this exemplary embodiment, the instructions communicated by the control subsystem 170 to the damming conveyor 30 and destacking conveyor 40 are informed by data from the damming conveyor sensor 162, the first destacking conveyor sensor 164, the second destacking conveyor sensor 166, and the downstream conveyor sensor 168.

Referring still to FIG. 7, the control subsystem 170 includes a controller 172, such as a programmable logic controller (PLC), that communicates instructions to the damming conveyor 30 and to the destacking conveyor 40, which cause each of the damming conveyor 30 and the destacking conveyor 40 to be activated and deactivated based on data received from the damming conveyor sensor 162, the first destacking conveyor sensor 164, the second destacking conveyor sensor 166, and the downstream conveyor sensor 168. To this end, the damming conveyor sensor 162, the first destacking conveyor sensor 164, the second destacking conveyor sensor 166, and the downstream conveyor sensor 168 are each operably connected to the controller 172, such that data collected by the sensors is transmitted to the controller 172 for subsequent processing. The controller 172 includes a processor 174 for executing instructions (routines) stored in a memory component 176 or other computer-readable medium. The controller 172 analyzes the data received from the damming conveyor sensor 162, the first destacking conveyor sensor 164, the second destacking conveyor sensor 166, and the downstream conveyor sensor 168, and then communicates instructions to selectively activate and deactivate the damming conveyor 30 and the destacking conveyor 40 based on the positioning of parcels within the system 100.

Referring now to FIGS. 6 and 7, in some embodiments, when the system 100 is initially started or the downstream conveyor sensor 168 communicates data to the controller 172 indicating that it does not detect the presence of parcels on the downstream conveyor 50, the controller 172 communicates instructions which causes (i) the damming conveyor 30 to run (i.e., convey parcels) until the damming conveyor sensor 162 detects the presence of a parcel, and (ii) the destacking conveyor 40 to run until the first destacking conveyor sensor 164 and the second destacking conveyor sensor 166 each detect the presence of a parcel. Following such sequence, the controller 172 may then communicate instructions which cause the destacking conveyor 40 to run a predetermined (jog) distance to offload any parcels located near the distal end 40b of the destacking conveyor 40 onto the downstream conveyor 50. To avoid overwhelming the downstream conveyor 50 and/or a robot singulator picking parcels therefrom, the destacking conveyor 40 preferably remains deactivated until the downstream conveyor sensor 168 communicates data to the controller 172 indicating that no parcels are detected on the downstream conveyor 50. Upon determining that all parcels have been removed from the downstream conveyor 50, the controller 172 then communicate instructions which cause the damming conveyor 30 and the destacking conveyor 40 to again run until the presence of a parcel is detected by each of the damming conveyor sensor 162, the first destacking conveyor sensor 164, and the second destacking conveyor sensor 166.

Referring still to FIGS. 6 and 7, for efficiency, it is generally preferred that, each time one or more parcels are offloaded from the destacking conveyor 40 onto the downstream conveyor 50, the damming conveyor 30 and the destacking conveyor are indexed, such that a parcel is positioned at each of the distal end 30b of the damming conveyor 30, the proximal end 40a of the destacking conveyor 40, and the distal end 40b of the destacking conveyor 40, as shown in FIG. 6. In such a configuration, the parcels are effectively in queue for subsequent conveyance downstream and eventual offloading onto the downstream conveyor 50 in a manner which helps to reduce wait times between successive parcel deposits onto the downstream conveyor 50. To this end, in instances where neither the second destacking conveyor sensor 166 nor the downstream conveyor sensor 168 detect the presence of parcels, the controller 172 may be configured to communicate instructions which cause the destacking conveyor 40 to continuously run until the second destacking conveyor sensor 166 detects the presence of a parcel. Moreover, in instances where the damming conveyor sensor 162 detects the presence of a parcel and the first destacking conveyor sensor 164 does not, the controller 172 may be configured to communicate instructions which cause the damming conveyor 30 to run a predetermined (jog) distance until the first destacking conveyor sensor 164 detects the presence of a parcel. Furthermore, in instances where the first destacking conveyor sensor 164 detects the presence of a parcel, but the damming conveyor sensor 162 does not, the controller 172 may be configured to communicate instructions which cause the damming conveyor 30 to continuously run until both the damming conveyor sensor 162 and the first destacking conveyor sensor 164 detect the presence of a parcel. Of course, it should be appreciated that the controller 172 may be configured to communicate additional or alternative instructions to the damming conveyor 30 and/or the destacking conveyor 40 based on various data communicated from the damming conveyor sensor 162, the first destacking conveyor sensor 164, the second destacking conveyor sensor 166, and the downstream conveyor sensor 168 to accommodate different sorting applications or parcel volumes without departing from the spirit or scope of the present invention.

Figure 8:
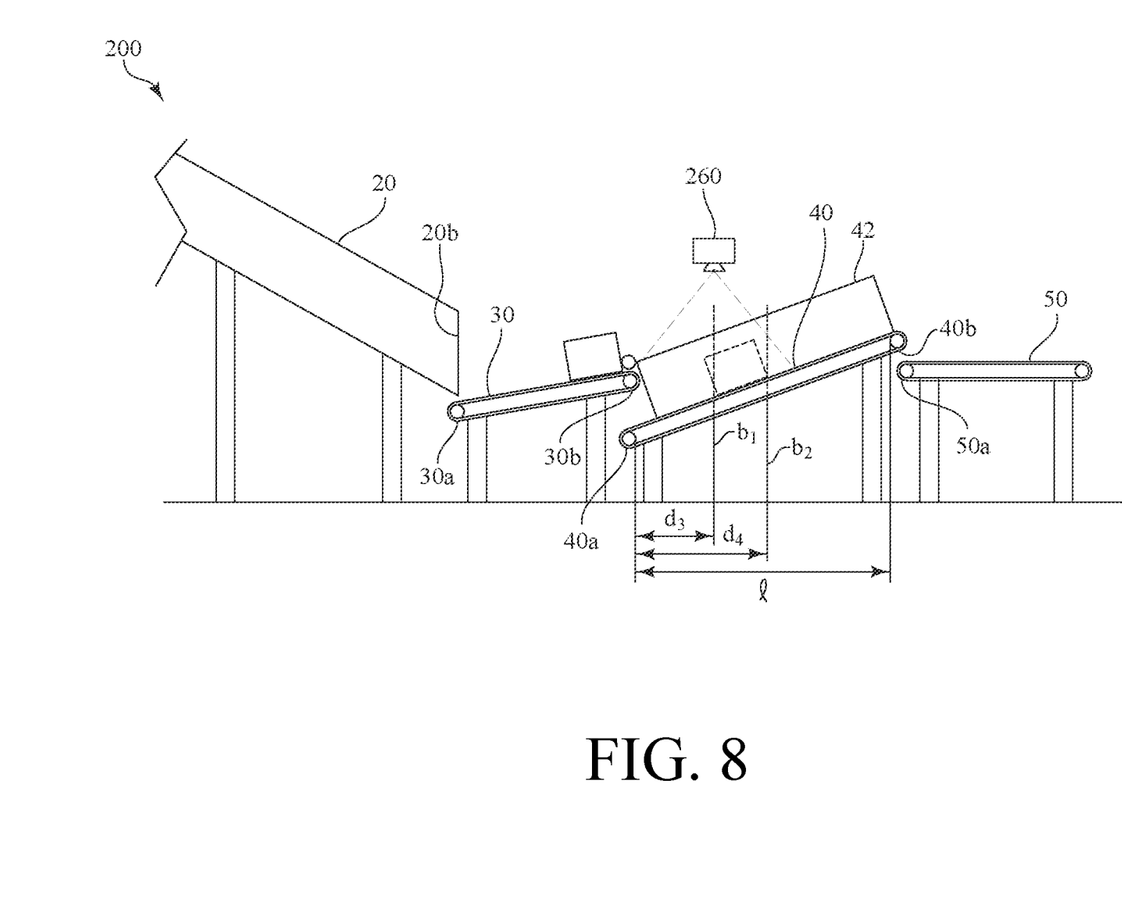
FIG. 8 is a side view of another exemplary system for managing parcel flow made in accordance with the present invention.

FIG. 8 is a side view of another exemplary system 200 for managing parcel flow made in accordance with the present invention. In this exemplary embodiment, the system 200 again includes an upstream conveyor 20, damming conveyor 30, destacking conveyor 40, and downstream conveyor 50. In other words, these components are identical to those described above with reference to FIGS. 1-5 and 6-7. Again, like components are provided with the same reference numeral throughout the present application. In this exemplary embodiment, however, instead of the damming conveyor 30 and the destacking conveyor 40 being activated and deactivated in accordance in a prearranged sequence or based on data from multiple sensors distributed at various locations throughout the system, the damming conveyor 30 is indexed in response to data received from a single destacking conveyor sensor 260 configured to detect the presence of parcels on the destacking conveyor 40. More specifically, in this embodiment, the destacking conveyor sensor 260 is a camera configured to acquire two-dimensional and/or three-dimensional image data of parcels along at least a portion of a length, l, of the destacking conveyor 40.

Figure 9:
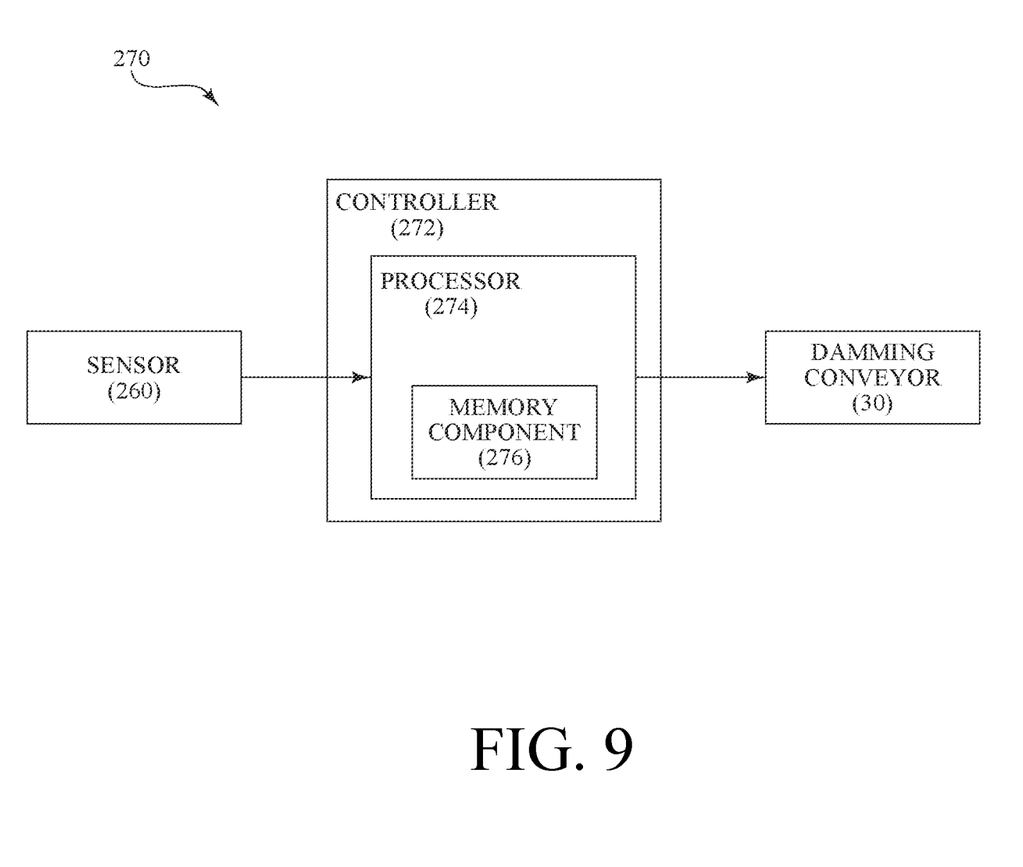
FIG. 9 is a schematic diagram of a control subsystem for regulating operation of the system of FIG. 8.

FIG. 9 is a schematic diagram of a control subsystem 270 for regulating operation of the damming conveyor 30 of the system 200. In this exemplary embodiment, the instructions communicated by the control subsystem 270 to the damming conveyor 30 are informed by data from the destacking conveyor sensor 260.

Referring still to FIG. 9, the control subsystem 170 includes a controller 272, such as a programmable logic controller (PLC), that communicates instructions to the damming conveyor 30, which cause the damming conveyor 30 to be activated and deactivated based on data received from the destacking conveyor sensor 260. To this end, the destacking conveyor sensor 260 is operably connected to the controller 272, such that data collected by the destacking conveyor sensor 260 is transmitted to the controller 272 for subsequent processing. The controller 272 includes a processor 274 for executing instructions (routines) stored in a memory component 276 or other computer-readable medium. The controller 272 analyzes the data received from the destacking conveyor sensor 260 and communicates instructions to selectively activate and deactivate the damming conveyor 30 based on the positioning of parcels on the destacking conveyor 40.

Referring now to FIGS. 8 and 9, in this exemplary embodiment, the controller 272 selectively activates and deactivates the damming conveyor 30 based on the positioning of parcels relative to predetermined boundaries (illustrated in dashed vertical lines) set along the length, l, of the destacking conveyor 40. In this regard, the controller 272 sets a first boundary, $b_1$, corresponding to a first distance, $d_3$, from the proximal end 40a of the destacking conveyor 40 and a second boundary, $b_2$, corresponding to a second distance, $d_4$, from the proximal end 40a of the destacking conveyor 40. The controller 272 determines the positioning of parcels on the destacking conveyor 40 relative to the first boundary, $b_1$, and the second boundary, $b_2$, based on data received from the destacking conveyor sensor 260. The controller 272 then communicates instructions to the damming conveyor 30 based on that determination. Specifically, when the controller 272 receives data from the destacking conveyor sensor 260 indicating that no parcels are present between the proximal end 40a of the destacking conveyor 40 and the first boundary, $b_1$, the controller 272 communicates instructions which cause the damming conveyor 30 to run until parcels are detected at the second boundary, $b_2$. The damming conveyor 30 will then remain at rest until the controller 272 receives data from the destacking conveyor sensor 260 indicating that no parcels are present between the proximal end 40a of the destacking conveyor 40 and the first boundary, $b_1$, at which time the foregoing process is repeated. Of course, it should be appreciated that the controller 272 can be configured to communicate additional or alternative instructions to the damming conveyor 30 based on the parcels location relative to the first boundary, $b_1$, and the second boundary, $b_2$, to accommodate different sorting applications or parcel volumes without departing from the spirit or scope of the present invention.

In the exemplary embodiment described above with respect to FIGS. 6-7, the destacking conveyor 40 is configured to continuously run; however, it is contemplated that, in alternative embodiments, the destacking conveyor 40 of the system 200 may also be selectively activated and deactivated based on instructions from the control subsystem 270. Accordingly, in some embodiments of the system 200, the destacking conveyor 40 may also be operably connected to the control subsystem 270.

Although the present invention is described primarily in the context of processing parcels within a sorting facility, it is appreciated that the present invention may be utilized in alternative applications or environments in which objects need to be conveyed downstream in a controlled manner.

One of ordinary skill in the art will recognize that additional embodiments and implementations are also possible without departing from the teachings of the present invention. This detailed description, and particularly the specific details of the exemplary embodiments and implementations disclosed therein, is given primarily for clarity of understanding, and no unnecessary limitations are to be understood therefrom, for modifications will become obvious to those skilled in the art upon reading this disclosure and may be made without departing from the spirit or scope of the invention.

What is claimed is:

1. A system for managing parcel flow, comprising:
   a damming conveyor having a proximal end for receiving a bulk flow of parcels from an upstream conveyor and a distal end, the damming conveyor being oriented at a predetermined angle relative to an underlying ground surface; and
   a destacking conveyor having a proximal end positioned below and at a predetermined distance from the distal end of the damming conveyor for receiving parcels offloaded from the damming conveyor and a distal end from which parcels can be offloaded onto a downstream conveyor, the destacking conveyor being oriented at a predetermined angle relative to the underlying ground surface;

wherein the damming conveyor is selectively activated to offload parcels onto the destacking conveyor in discrete batches; and wherein the damming conveyor is oriented at an angle in a range of 10-20° relative to the underlying ground surface.

2. A system for managing parcel flow, comprising:

a damming conveyor having a proximal end for receiving a bulk flow of parcels from an upstream conveyor and a distal end, the damming conveyor being oriented at a predetermined angle relative to an underlying ground surface; and a destacking conveyor having a proximal end positioned below and at a predetermined distance from the distal end of the damming conveyor for receiving parcels offloaded from the damming conveyor and a distal end from which parcels can be offloaded onto a downstream conveyor, the destacking conveyor being oriented at a predetermined angle relative to the underlying ground surface;

wherein the damming conveyor is selectively activated to offload parcels onto the destacking conveyor in discrete batches; and wherein the destacking conveyor is oriented at an angle of approximately 20° relative to the underlying ground surface.

3. A system for managing parcel flow, comprising:

a damming conveyor having a proximal end for receiving a bulk flow of parcels from an upstream conveyor and a distal end, the damming conveyor being oriented at a predetermined angle relative to an underlying ground surface; and a destacking conveyor having a proximal end positioned below and at a predetermined distance from the distal end of the damming conveyor for receiving parcels offloaded from the damming conveyor and a distal end from which parcels can be offloaded onto a downstream conveyor, the destacking conveyor being oriented at a predetermined angle relative to the underlying ground surface; and a control subsystem operably connected to the damming conveyor, the control subsystem including a controller with a processor configured to execute instructions stored in a memory component to communicate instructions to the damming conveyor which activate and deactivate the damming conveyor in a prearranged sequence to offload parcels onto the destacking conveyor in discrete batches.

4. A system for managing parcel flow, comprising:

a damming conveyor having a proximal end for receiving a bulk flow of parcels from an upstream conveyor and a distal end, the damming conveyor being oriented at a predetermined angle relative to an underlying ground surface; and a destacking conveyor having a proximal end positioned below and at a predetermined distance from the distal end of the damming conveyor for receiving parcels offloaded from the damming conveyor and a distal end from which parcels can be offloaded onto a downstream conveyor, the destacking conveyor being oriented at a predetermined angle relative to the underlying ground surface; and a control subsystem operably connected to the damming conveyor, the control subsystem including
one or more sensors for acquiring data corresponding to the positioning of parcels within the system, and a controller operably connected to the one or more sensors and including a processor configured to execute instructions stored in a memory component to (i) receive and analyze data received from the one or more sensors to identify the positioning of parcels within the system, and (ii) communicate instructions to the damming conveyor which activate or deactivate the damming conveyor to offload parcels onto the destacking conveyor in discrete batches.

5. The system as recited in claim 4, wherein the control subsystem is also operably connected to the destacking conveyor, and wherein the processor is configured to execute instructions stored in the memory component to communicate instructions to the destacking conveyor which activate or deactivate the destacking conveyor.

6. The system as recited in claim 4, wherein the one or more sensors includes a photoelectric eye.

7. The system as recited in claim 4, wherein the one or more sensors includes a camera.

8. The system as recited in claim 4, wherein the communication of instructions which activate or deactivate the damming conveyor is based, at least in part, on the positioning of parcels along the destacking conveyor.

9. A system for managing parcel flow, comprising:

a damming conveyor having a proximal end for receiving a bulk flow of parcels from an upstream conveyor and a distal end, wherein the damming conveyor can be selectively activated to offload parcels from the distal end of the damming conveyor in discrete batches;

a destacking conveyor having a proximal end for receiving parcels offloaded from the damming conveyor and a distal end, wherein the destacking conveyor is oriented at a predetermined angle relative to an underlying ground surface and can be selectively activated to offload parcels from the distal end of the destacking conveyor onto a downstream conveyor; and a control subsystem operably connected to the damming conveyor and the destacking conveyor, the control subsystem including
one or more sensors for acquiring data corresponding to the positioning of parcels within the system, and
a controller operably connected to the one or more sensors and including a processor configured to execute instructions stored in a memory component to (i) receive and analyze data received from the one or more sensors to identify the positioning of parcels within the system, (ii) communicate instructions to the damming conveyor which activate or deactivate the damming conveyor, and (iii) communicate instructions to the destacking conveyor which activate or deactivate the destacking conveyor.

10. The system as recited in claim 9, wherein the one or more sensors includes (i) a damming conveyor sensor configured to detect the presence of parcels at a location along a length of the damming conveyor, and (ii) one or more destacking conveyor sensors, with each of the one or more destacking conveyor sensors being configured to detect the presence of parcels at a location along a length of the destacking conveyor.

11. The system as recited in claim 10, wherein the one or more destacking conveyor sensors includes (i) a first destacking conveyor sensor configured to detect the presence of parcels at a location between the proximal end and the distal end of the destacking conveyor, and (ii) a second destacking conveyor sensor configured to detect the presence of parcels at the distal end of the destacking conveyor.

12. The system as recited in claim 10, wherein the damming conveyor sensor is configured to detect the presence of parcels at the distal end of the damming conveyor.

13. The system as recited in claim 9, wherein the one or more sensors includes one or more photoelectric eyes for acquiring data corresponding to the positioning of parcels on one or both of the damming conveyor and the destacking conveyor.

14. The system as recited in claim 9, wherein the one or more sensors includes a camera for acquiring data corresponding to the presence of parcels on the downstream conveyor.

15. The system as recited in claim 9, wherein the proximal end of the destacking conveyor is positioned below the distal end of the damming conveyor, and the damming conveyor is orientated at a predetermined angle relative to the underlying ground surface.

16. The system as recited in claim 15, wherein the damming conveyor is oriented at an angle in a range of 10–20° relative to the underlying ground surface.

17. The system as recited in claim 15, wherein the destacking conveyor is oriented at an angle of approximately 20° relative to the underlying ground surface.

18. A system for managing parcel flow, comprising:
   an upstream conveyor for delivering a bulk flow of parcels;
   a damming conveyor having a proximal end for receiving the bulk flow of parcels from the upstream conveyor and a distal end, wherein the damming conveyor is oriented at a predetermined angle relative to an underlying ground surface and can be selectively activated to offload parcels from the distal end of the damming conveyor in discrete batches;
   a destacking conveyor having a proximal end positioned below the distal end of the damming conveyor at a predetermined distance to receive parcels offloaded from the damming conveyor and a distal end, wherein the destacking conveyor is oriented at a predetermined angle relative to the underlying ground surface and can be selectively activated to offload parcels from the distal end of the destacking conveyor onto a downstream conveyor; and
   a control subsystem operably connected to the damming conveyor and the destacking conveyor, the control subsystem including
      one or more sensors for acquiring data corresponding to the positioning of parcels within the system, and
      a controller operably connected to the one or more sensors and including a processor configured to execute instructions stored in a memory component to (i) receive and analyze data received from the one or more sensors to identify the positioning of parcels within the system, (ii) communicate instructions to the damming conveyor which activate or deactivate the damming conveyor, and (iii) communicate instructions to the destacking conveyor which activate or deactivate the destacking conveyor.

19. The system as recited in claim 18, wherein the one or more sensors includes (i) a first photoelectric eye configured to acquire data corresponding to the presence of parcels at the distal end of the damming conveyor, (ii) a second photoelectric eye configured to acquire data corresponding to the presence of parcels at a location between the proximal end and the distal end of the destacking conveyor, (iii) a third photoelectric eye configured to acquire data corresponding to the presence of parcels at the distal end of the destacking conveyor, and (iv) a camera for acquiring data corresponding to the presence of parcels on the downstream conveyor.

20. A system for managing parcel flow, comprising:
   an upstream conveyor for delivering a bulk flow of parcels, wherein the upstream conveyor is in a declining orientation, with its proximal end at a higher elevation than its distal end;
   a damming conveyor having a proximal end for receiving the bulk flow of parcels from the upstream conveyor and a distal end, wherein the damming conveyor is oriented at a predetermined angle relative to an underlying ground surface, with its proximal end at a lower elevation than its distal end, and wherein the damming conveyor can be selectively activated to convey parcels from its proximal end to its distal end; and
   a control subsystem operably connected to the damming conveyor, the control subsystem including
      a controller including a processor configured to execute instructions stored in a memory component to communicate instructions to the damming conveyor which activate and deactivate the damming conveyor.

21. The system as recited in claim 20, wherein the control subsystem further includes one or more sensors for acquiring data corresponding to the positioning of parcels within the system, and wherein the processor is configured to execute instructions stored in the memory component to (i) receive and analyze data received from the one or more sensors to identify the positioning of parcels within the system, and (ii) communicate instructions to the damming conveyor which activate or deactivate the damming conveyor.

22. The system as recited in claim 20, wherein the upstream conveyor is a chute, which defines a pathway along which the bulk flow of parcels can slide downward from the proximal end to the distal end under the force of gravity.

23. The system as recited in claim 20, wherein the damming conveyor is oriented at an angle in a range of 10-20° relative to the underlying ground surface.

* * * * *